United States Patent [19]

Collins et al.

[11] 3,955,083
[45] May 4, 1976

[54] INTERFEROMETRIC DEVICE FOR ENCODING SHAFT ANGLES

[75] Inventors: Christian James Collins, Letchworth; Gilbert Frank Stanley, St. Albans, both of England

[73] Assignee: Hawker Siddeley Dynamics Limited, England

[22] Filed: Nov. 25, 1974

[21] Appl. No.: 527,170

[30] Foreign Application Priority Data

Nov. 27, 1973 United Kingdom............... 54872/73
Mar. 4, 1974 United Kingdom............... 09615/74
Mar. 7, 1974 United Kingdom............... 10205/74

[52] U.S. Cl. ........................... 250/231 SE; 356/110
[51] Int. Cl.² ......................................... G01D 5/34
[58] Field of Search .......... 356/106, 110, 111, 112, 356/113; 250/231 R, 231 SE, 237 G

[56] References Cited
UNITED STATES PATENTS

| | | |
|---|---|---|
| 3,471,239 | 10/1969 | Woodson ........................... 356/110 |
| 3,551,055 | 12/1970 | Chitayat............................. 356/110 |
| 3,729,260 | 4/1973 | Walsh ................................. 356/110 |
| 3,731,373 | 5/1973 | Johnson ....................... 250/231 SE |
| 3,791,739 | 2/1974 | Kawasaki........................... 356/106 |

*Primary Examiner*—Alfred E. Smith
*Assistant Examiner*—D. C. Nelms
*Attorney, Agent, or Firm*—Rose & Edell

[57] ABSTRACT

In a shaft angle encoder, an optical system translates the shaft angular displacement into a difference of two optical path lengths and that difference is measured by interferometry. Light from a monochromatic source is split and both the transmitted and reflected beams are passed along separate paths through an optical component that moves angularly with the shaft and varies the lengths of the separate paths differentially according to the shaft angular displacement. The transmitted and reflected beams are then recombined and the interference fringes in the recombined beam sensed by a detector.

9 Claims, 5 Drawing Figures

INTERFEROMETRIC DEVICE FOR ENCODING SHAFT ANGLES

This invention relates to shaft angle or shaft torque encoders.

A requirement sometimes arises for accurate measurement of rotation of a shaft. This can be achieved by the use of a disc attached to the shaft, the position of a point on the circumference of this disc being measured to determine the shaft rotation. Typically, this position measurement is achieved by optical means, involving the use of graticule markings on the circumference of the disc. Where high accuracy is called for, the method requires the use of a large disc and/or finely graduated markings. Also, rectilinear translations of the shaft, or rotations about axes other than the nominal axis of rotation, can give rise to significant problems.

According to the present invention, there is provided a method of measuring shaft angle or torque, comprising employing an optical system to convert angular displacements representative of the angles or torques to be measured into differences in the lengths of two optical paths, and measuring said optical path length differences by interferometric means.

The invention further provides apparatus for performing this method comprising a source of monochromatic light, a beam splitter splitting the beam from said source into transmitted and reflected beams, an angular-displacement-responsive optical assembly through which the transmitted and reflected beams pass along separate paths, means for bringing the transmitted and reflected beams together after their passage along said separate paths to form a recombined beam, and detector means toward which the recombined beam is directed and which detects interference fringes in the recombined beams, said angular-displacement-responsive optical assembly including at least one optical component that is arranged to be displaced angularly relatively to the remainder of the system by amounts representative of the angles or torques to be measured and thereby differently varying the respective lengths of said separate paths.

It is to be understood that the term 'optical' as used herein embraces other wavelengths than the visible range, for example infra red radiation.

Arrangements according to the invention will now be described by way of example and with reference to the accompanying drawings, in which:

FIG. 1 illustrates one embodiment of the invention. The interferometer shown is based upon the Michelson arrangement, but other two-path interferometer systems can also be used.

Figure 1:
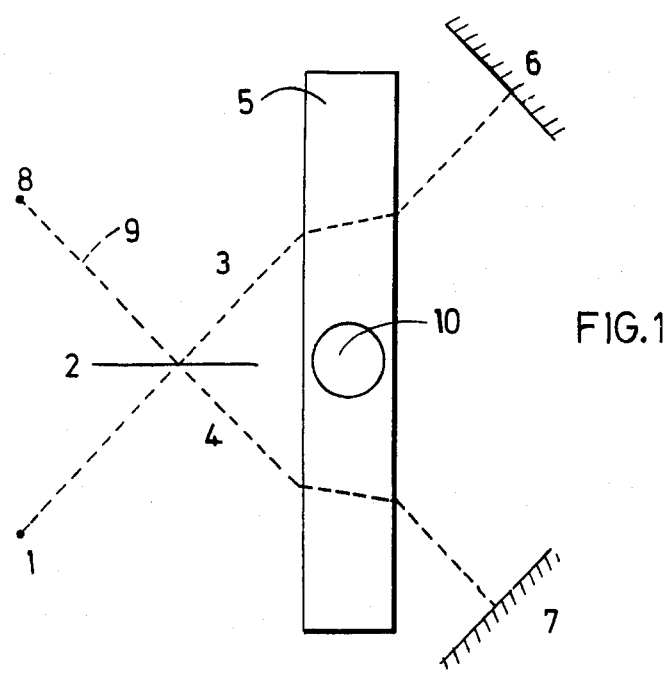
FIG. 1 is a diagram of a first interferometric shaft angle encoder.

Radiation from an essentially monochromatic radiation source 1 is divided by a beam splitter 2. The transmitted and reflected rays, following paths 3 and 4 respectively, both pass through a plane parallel transparent plate or slab 5 of refracting material, such as glass, to reflectors 6 and 7. These reflectors return the rays along their own paths, back through the slab 5 to the beam splitter 2. The reflected component of the return ray along path 3 combines with the transmitted component of the return ray along path 4 to form a beam 9 giving interference fringes in the region of a radiation detector 8. Lenses (not shown) or other powered optical component may be included in the radiation paths to facilitate the production of suitable fringes.

Rotation of the slab 5 about an axis perpendicular to the plane of the paper, i.e. the axis of a shaft 10 the rotation of which is to be measured and to which the slab 5 is attached, changes the relative lengths of the paths 2,3,6 and 2,4,7. This results in a fringe shift at the detector 8 which is a measure of shaft rotation.

The beam splitter 2 is conveniently set in a plane perpendicular to the slab 5 in the zero, or central, position of the shaft, with rays 3 and 4 having equal (but opposite) incident angles of 45° upon the slab. Shaft rotations up to ± 45° about this position can then be accommodated and produce readily calculable fringe shifts.

This shift encoder has the following advantages:

i. It is relatively compact.

ii. There is no requirement for a fine precision graticule.

iii. It is insensitive to all shaft translations.

iv. In the zero position, it is insensitive to shaft rotations apart from those about the required axis of measurement.

v. At positions other than zero, shaft rotations, other than those about the required axis of measurement, give rise only to second order errors.

Figure 2:
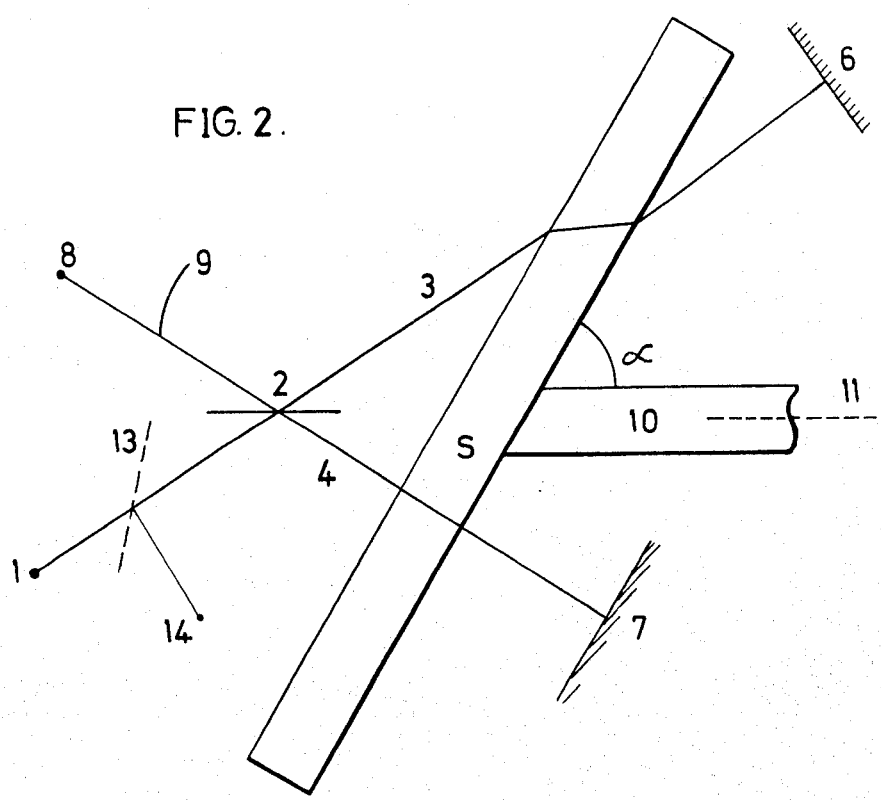
FIG. 2 is a diagram of a second form of interferometric shaft angle encoder.

However, the arrangement of FIG. 1 suffers from the disadvantage that shaft rotations of 360° or more can not be directly measured. In the arrangement of FIG. 2 this drawback is overcome by a small re-arrangement of the equipment. Some components, such as lenses, are omitted for clarity. As before, the slab of glass 5 is rotated to cause a difference to appear between the two path lengths, 2,3,6, and 2,4,7. However in this case the axis 11 of the shaft 10 lies in the plane of the paper, and in the plane of the beam splitter 2, and the the glass slab 5 is attached at a fixed inclination $\alpha$ to the shaft 10. Rotation of the shaft 10 about the axis 11 causes the slab 5 to wobble thus varying the difference between the two path lengths.

If desired, two or more interferometer systems may be provided to maintain good resolution at all rotation angles of the shaft.

As in the previous arrangement, the encoder is insensitive to rectilinear translations of the glass slab 5 in any direction.

A further requirement which frequently arises with incremental shaft angle encoders is to provide a fixed reference point. In either of the arrangements described this may be achieved by using as a reference point or points the angle or angles at which the two path lengths 2,3,6, and 2,4,7, are equal. This can conveniently be achieved by the use of white light, since a maximum due to additive interference of the two beams is only seen when the two path lengths are equal; at all other shaft positions interference between light of different colours totally or partially oblitertes the fringes. In this context the term 'white light' implies radiation covering a sufficiently broad band of wavelengths to reduce subsidiary fringe maxima to a level significantly below that of the reference maximum, so that the latter may be readily distinguished by the detector 8.

It is convenient to be able to monitor the 'white light' fringes without recourse to an additional detector or significant additions to the optical system. This may be achieved by the introduction of 'white light' by an optical mixing element. By way of example, this is depicted as a partially reflecting plane mirror, shown in broken line at 13, receiving light from a 'white' light source 14.

In order to distinguish between the two sources, 14 and 1, (the latter being the monochromatic source) one or both sources may be modulated; in the latter case, different modulation regimes are applied to each source. The signals from the two sources can then be separated by suitable electronic processing.

It is desirble in some cases not only to measure the amount of rotation but also its sense or direction. A convenient means of achieving this is to produce fringes which move across two detectors 8 as the shaft 10 rotates, the positions of the detectors being such that the signals produced in them are 90° out of phase. Well known electronic processing techniques may then be used to sense the direction of rotation.

Figure 3:
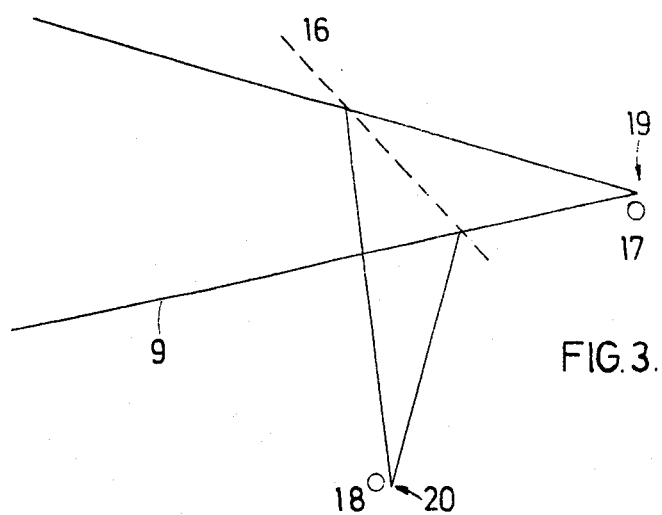
FIG. 3 is a diagram of a modification of the detector arrangement of the embodiments described.

One problem which can arise is that the two detector elements must be close together and this can be difficult to arrange with some types of detector package. This may be avoided by the use of a two-element detector in which the elements are in close proximity on a common substrate, or alternatively by some form of splitting of the light beam falling upon the detectors. FIG. 3 shows one way in which this latter may be achieved. The focussed beam 9 from the beam splitter 2 (not shown in FIG. 3) is split by a plane semi-silvered mirror 16. Detectors 17 and 18 are placed near the two foci 19 and 20, of the transmitted and reflected beam portions, the detector being offset slightly in each case to obtain the required positioning with respect to the fringe pattern. By this means constraints set by the physical size of the detector packages are largely removed.

A further use for the device described, in either the FIG. 1 or FIG. 2 embodiment, is as a torque measuring device. The glass slab 5 is attached to one point on a shaft and remaining components are carried by a sleeve coaxial with the shaft and joined to the shaft at another point along its length. When a torque is applied to the shaft, relative twist occurs between the two afore-mentioned axially-separated points, with the result that the slab 1 moves angularly with respect to the other components according to the torque applied. In an alternative arrangement, the glass slab 5 can be attached to the sleeve and the remaining components carried directly by the shaft, the principle of operation being unchanged.

Furthermore, since the encoder is insensitive to rectilinear translation of the glass slab, other arrangements for torque measurement are possible, e.g. by the longitudinal bending of a rod or beam under torque.

A possible disadvantage of the arrangements described above is that the transparent plate or slab 5 has to be comparatively large in area to transmit the two separated light beams 3 and 4 initially diverging from the beam splitter 2. The optical system can be rearranged so that the two light beams cross over at, or in the vicinity of, the centre of the plate 5, thus reducing the size, weight and moment of inertia of the plate and the overall dimensions of the encoder.

Figure 4:
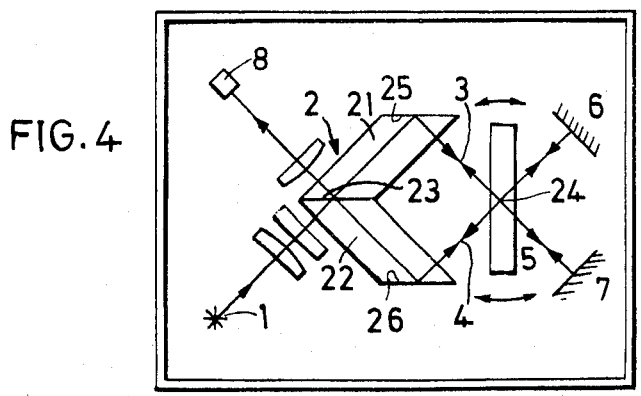
FIG. 4 is a diagram of a third embodiment.

FIG. 4 shows one optical arrangement for achieving this object. It employs a beam splitting component 2 comprising two rhomboidal prisms 21, 22 having a common semi-reflecting interface 23. The beam from the source 1 is split at the interface 23 after which the transmitted and reflected beams travel respectively through the prisms 21 and 22 until they are reflected out by the internal end faces 25, 26 of the prisms remote from the common interface. The emerging beams 3, 4 are arranged to cross over at a chosen central point 24 in the transparent plate or slab 5.

A further possible disadvantage of the previous arrangements is that when very high accuracy is required, the transparent plate or slab 5 needs to be comparatively thick and long and may thus be adversely affected by lack of homogeneity of the material and change of refractive index with temperature. In such case, the transparent plate can be replaced by a mirror arrangement not subject to these disadvantages.

Figure 5:
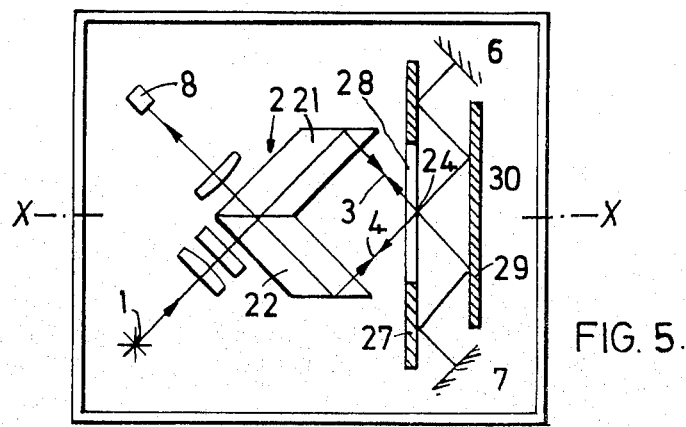
FIG. 5 is a diagram of a fourth embodiment.

FIG. 5 shows an embodiment in which the arrangement of FIG. 4 is employed except that the slab 5 is replaced by an annular mirror 27 (or two separate arcuate mirrors) around a central aperture 28 together with a second mirror 29 (or two separate mirrors) beyond the aperture parallel to and spaced from the first mirror 27. These mirrors, which are rigidly fixed together and move as one piece, turn angularly with respect to the remaining components about an axis 30 perpendicular to the plane of the diagram. The beams 3,4, pass first through aperture 28, crossing over at the point 24, and then are reflected by the front face of the back mirror 29 on to the back face of the annular mirror 27, whence they are reflected again to the fixed mirrors 6,7.

By making the mirror 27 in the form of an annulus on a transparent plate and mounting the two-mirror assembly 27,29 obliquely on a shaft positioned with its axis along line XX, in the manner of the slab 5 in FIG. 2, this arrangement can also be made to measure unlimited rotations about the axis XX.

What we claim is:

1. Apparatus for measuring shaft angle, comprising a source of monochromatic light, a beam splitter splitting the beam from said source into transmitted and reflected beams, an angular-displacement-responsive optical assembly through which the transmitted and reflected beams pass along separate paths, means for bringing the transmitted and reflected beams together after their passage along said separate paths to form a recombined beam, and detector means toward which the recombined beam is directed and which detects interference fringes in the recombined beam, said angular-displacement-responsive optical assembly including at least one optical component that is arranged to be displaced angularly relatively to the remainder of the system by amounts representative of the angle to be measured and thereby differently varying the respective lengths of said separate paths.

2. Apparatus according to claim 1, wherein said angularly-displaceable optical component is a slab of transparent refractive material, disposed in a region through which, but for the presence of said slab, the transmitted and reflected beams from the beam splitter would pass along oppositely-angled paths.

3. Apparatus according to claim 2, wherein the slab is mounted on a shaft to turn about an axis perpendicular to the plane containing said oppositely angled paths.

4. Apparatus according to claim 2, wherein the slab is mounted obliquely on a shaft, whereby the slab wobbles when the shaft turns.

5. Apparatus according to claim 1, wherein, after departure from the beam splitter along oppositely-angled divergent paths, the transmitted and reflected beams are reflected inward to cross over in the region of the centre of said angularly-displaceable optical component.

6. Apparatus according to claim 5, wherein the beam splitter is constituted by a common interface of two rhomboidal prisms through which the transmitted and reflected beams respectively pass to be reflected inward toward the cross-over point at the internal faces of the respective prism ends remote from the common interface.

7. Apparatus according to claim 1, wherein said angularly-displaceable optical component comprises a first mirror lying substantially in a plane containing the crossover point of said transmitted and reflected beams and disposed around a central aperture in which the cross-over point lies, and a second mirror that is parallel to and displaced from the first, in an arrangement such that the reflecting surfaces of the first and second mirrors face toward one another and the second mirror receives the transmitted and reflected beams after they have passed through said aperture and beyond the crossover point and reflects them back to be re-reflected at the reflecting surface of the first mirror.

8. Apparatus according to claim 1, wherein the re-combined beam is itself split to produce transmitted and reflected beams which are directed toward different interference fringe detectors that are disposed to produce signals 90° out of phase.

9. Apparatus according to claim 1, further comprising means for mixing into the light beam from the source to the beam splitter light from a 'white' light source, at least one source being modulated.

* * * * *